United States Patent
Cho et al.

(10) Patent No.: US 8,432,672 B2
(45) Date of Patent: Apr. 30, 2013

(54) FLAT PANEL DISPLAY

(75) Inventors: Dai-Han Cho, Yongin (KR); Dong-Su Yee, Yongin (KR); Chan-Kyoung Moon, Yongin (KR); Hyun-Hee Lee, Yongin (KR); Min-Su Kim, Yongin (KR); Kuen-Dong Ha, Yongin (KR); Jae-Yong Kim, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 313 days.

(21) Appl. No.: 12/875,201

(22) Filed: Sep. 3, 2010

(65) Prior Publication Data

US 2011/0080695 A1    Apr. 7, 2011

(30) Foreign Application Priority Data

Oct. 6, 2009    (KR) .................. 10-2009-0094624

(51) Int. Cl.
    *G06F 1/16*    (2006.01)
(52) U.S. Cl.
    USPC ..................... 361/679.21; 345/58
(58) Field of Classification Search ............ 361/679.01; 349/58
    See application file for complete search history.

(56) References Cited

U.S. PATENT DOCUMENTS

| | | | |
|---|---|---|---|
| 5,659,376 A * | 8/1997 | Uehara et al. .................. 349/58 |
| 5,909,081 A * | 6/1999 | Eida et al. ..................... 313/504 |
| 6,532,152 B1 * | 3/2003 | White et al. ................... 361/692 |
| 6,574,096 B1 * | 6/2003 | Difonzo et al. ......... 361/679.27 |
| 6,812,976 B2 | 11/2004 | Satonaka |
| 6,922,335 B2 * | 7/2005 | Shimada et al. ......... 361/679.55 |
| 7,495,738 B2 * | 2/2009 | Okuda .......................... 349/150 |
| 7,505,092 B2 | 3/2009 | Ichioka et al. |
| 7,535,547 B2 | 5/2009 | Tannas, Jr. |
| 7,535,698 B2 * | 5/2009 | Iwamoto et al. ......... 361/679.55 |
| 7,808,776 B2 * | 10/2010 | Bauer et al. .............. 361/679.26 |
| 7,903,399 B2 * | 3/2011 | Kim et al. ................ 361/679.21 |
| 2006/0044490 A1 | 3/2006 | Ichioka et al. |
| 2006/0113905 A1 | 6/2006 | Nakamura |
| 2007/0177092 A1 | 8/2007 | Hosoya |
| 2008/0120946 A1 | 5/2008 | Bayne et al. |
| 2008/0137272 A1 * | 6/2008 | Cheng et al. .................. 361/681 |
| 2008/0170170 A1 | 7/2008 | Jung et al. |
| 2009/0011197 A1 * | 1/2009 | Matsuhira ..................... 428/192 |
| 2009/0080148 A1 * | 3/2009 | Sugawara ............... 361/679.02 |
| 2009/0128732 A1 | 5/2009 | Hamada |
| 2009/0201635 A1 | 8/2009 | Kim et al. |
| 2010/0103599 A1 * | 4/2010 | Kwak et al. .............. 361/679.01 |
| 2010/0103641 A1 * | 4/2010 | Cho et al. ...................... 361/829 |
| 2011/0038112 A1 * | 2/2011 | Shintani et al. .......... 361/679.01 |
| 2011/0075342 A1 * | 3/2011 | Gotham et al. .......... 361/679.21 |

FOREIGN PATENT DOCUMENTS

| | | |
|---|---|---|
| JP | 2007293488 | 11/2007 |
| KR | 10-2000-0077415 A | 12/2000 |
| KR | 1020050064861 A | 6/2005 |
| KR | 100769425 B1 | 10/2007 |
| KR | 10-2008-0032990 A | 4/2008 |
| KR | 10-0897205 B1 | 5/2009 |

* cited by examiner

*Primary Examiner* — Lisa Lea Edmonds
(74) *Attorney, Agent, or Firm* — Robert E. Bushnell, Esq.

(57) ABSTRACT

A flat panel display device including a display panel, a bezel having a substrate to support the display panel and configured to receive the display panel, and a bonding agent disposed between the substrate of the bezel and the display panel. Further, the substrate of the bezel and the display panel may be bonded and fixed to each other. Therefore, it is possible to provide a flat panel display device having a small thickness and capable of improving strength against an external pressure.

13 Claims, 6 Drawing Sheets

FLAT PANEL DISPLAY

CLAIM OF PRIORITY

This application makes reference to, incorporates into this specification the entire contents of, and claims all benefits accruing under 35 U.S.C. §119 from an application earlier filed in the Korean Intellectual Property Office filed on Oct. 6, 2009 and there duly assigned Serial No. 2009-94624.

BACKGROUND OF THE INVENTION

1. Field of the Invention

The present invention relates to a flat panel display device.

2. Description of the Related Art

In general, flat panel display (FPDs) devices such as a liquid crystal display (LCD), a field emission display (FED) device, and an organic light emitting diode display device (OLED), are received in frames to physically and electrically protect flat display panels.

The above information disclosed in this Related Art section is only for enhancement of understanding of the background of the invention and therefore it may contain information that does not form the prior art that is already known to a person of ordinary skill in the art.

SUMMARY OF THE INVENTION

An aspect of the present invention provides for a flat panel display device configured to fix a display panel to a bezel through bonding and capable of improving strength against an external pressure even when the total thickness is small.

According to an aspect of the present invention, a flat panel display device includes a display panel, a bezel having a substrate to support the display panel and configured to receive the display panel, and a bonding agent disposed between the substrate of the bezel and the display panel.

In addition, a flat panel display device may include a display panel, and a bezel having a substrate to support the display panel and configured to receive the display panel, characterized in that the substrate of the bezel and the display panel are bonded and fixed to each other.

The flat panel display device may be any one of a liquid crystal display, a field emission display, and an organic light emitting diode display device.

The bezel may further include a bent part formed by bending a periphery of the substrate in the same direction, and a receiving part formed by the substrate and the bent part. Here, the display panel may be received in the receiving part.

The bezel may be formed of a metal material or a plastic material.

The display panel may include a device substrate having a pixel region, and an encapsulation substrate adhered to the device substrate by a sealant. The bonding agent may be interposed between the substrate of the bezel and the device substrate.

The bezel may further include a reinforcement part formed in the substrate.

The reinforcement part may have a shape pressed toward an outside of the substrate.

The reinforcement part may have any one shape of a linear shape, a spiral shape, a matrix shape, and a mesh shape.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
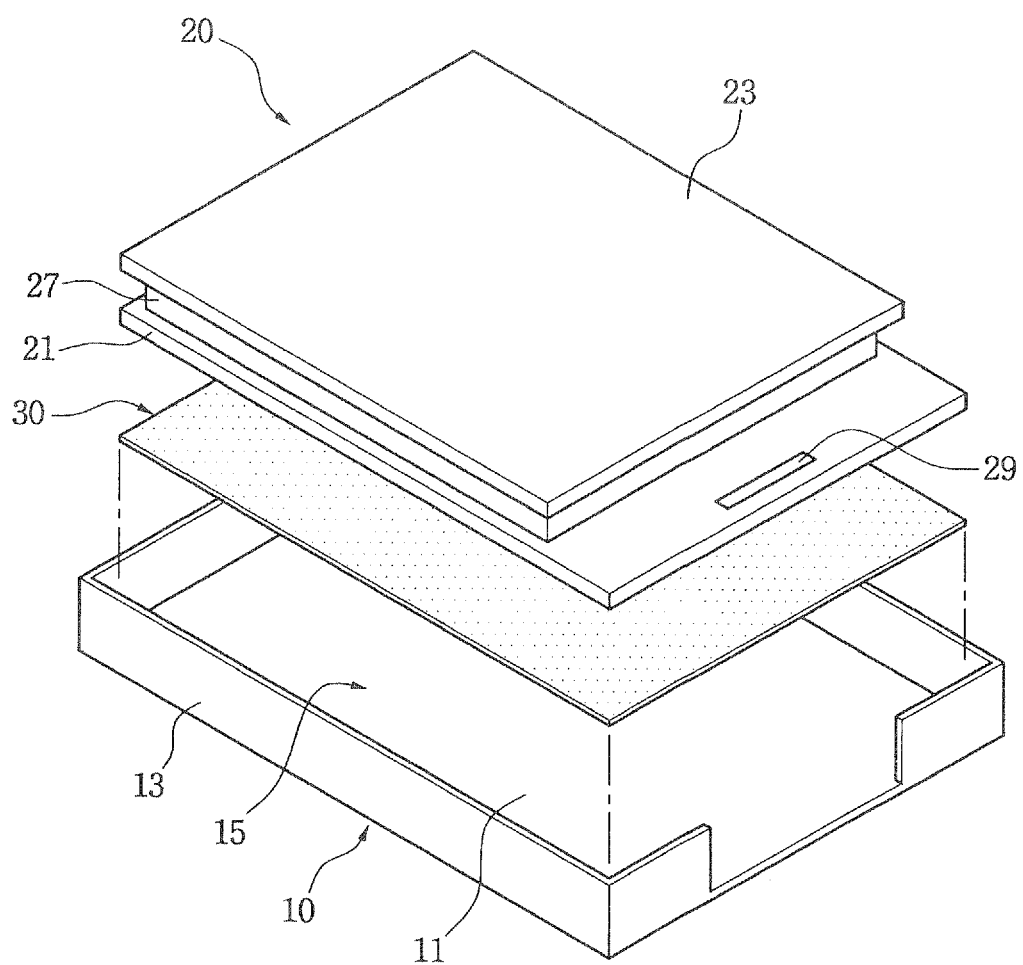
FIG. 1 is an exploded perspective view of a flat panel display device constructed as an exemplary embodiment of the present invention.

The present invention will now be described more fully hereinafter with reference to the accompanying drawings, in which exemplary embodiments of the invention are shown. This invention may, however, be embodied in different forms and should not be construed as limited to the embodiments set forth herein.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

In the conventional art, the flat display panel is fixed to the frame via a double-sided tape interposed between the frame and the flat display panel.

In this case, when the frame and the flat display panel are bent by applying a force from the exterior, the double-sided tape interposed between the frame and the flat display panel is pushed out so that it has merely the sum strength of the flat display panel and the frame.

Therefore, the only function of the double-sided tape interposed between the frame and the flat display panel is to attach two components, not to improve the strength, and thus, the double-sided tape only increases the total thickness.

Figure 2:
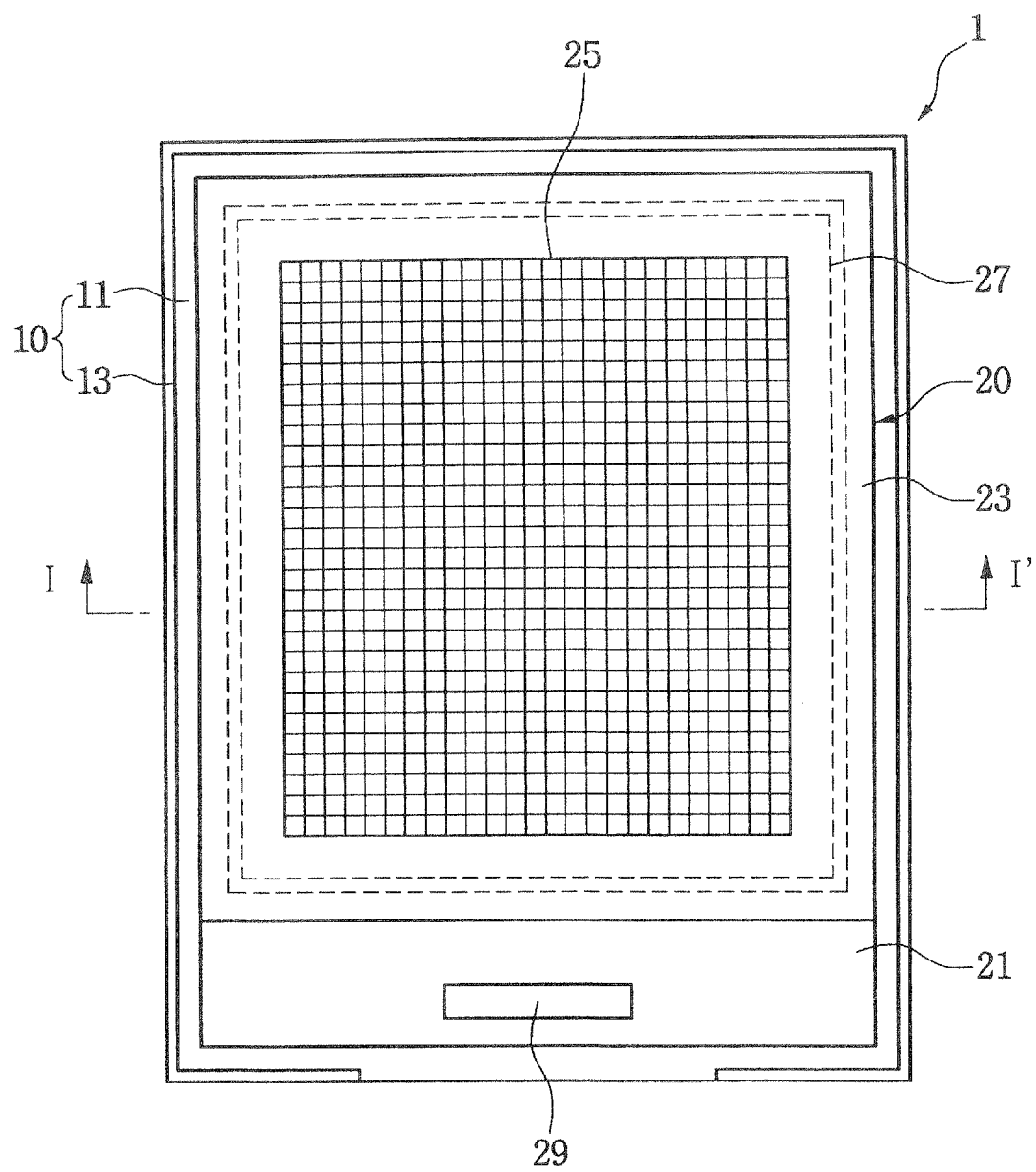
FIG. 2 a plan view of the flat panel display device of FIG. 1.
Figure 3:
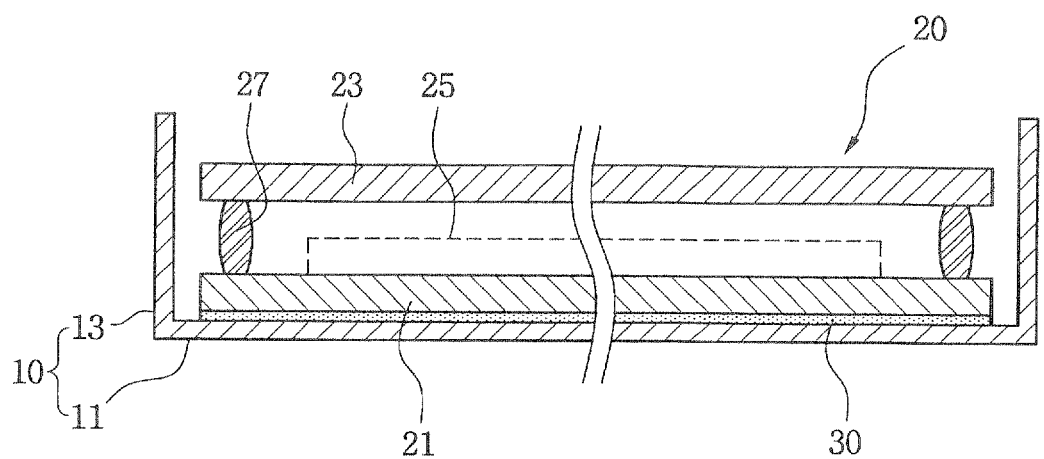
FIG. 3 is a cross-sectional view taken along line I-I' of FIG. 2.
Figure 4:
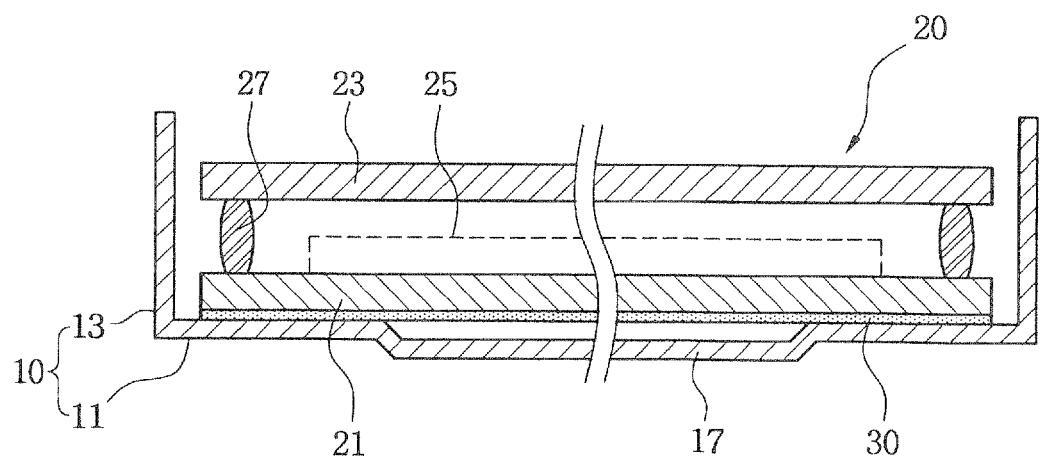
FIG. 4 is another cross-sectional view taken along line I-I' of FIG. 2.

FIG. 1 is an exploded perspective view of a flat panel display device constructed as an exemplary embodiment of the principles of the present invention, FIG. 2 is a plan view of the flat panel display of FIG. 1, FIG. 3 is a cross-sectional view taken along line I-I' of FIG. 2, FIG. 4 is another cross-sectional view taken along line I-I' of FIG. 2, and FIGS. 5A to 5E are perspective views showing various shapes of a reinforcement part shown in FIG. 4.

Referring to FIGS. 1 to 3, a flat panel display 1 in accordance with an exemplary embodiment of the present invention includes a bezel 10, a display panel 20 received in the bezel 10, and a bonding agent 30 interposed between the bezel 10 and the display panel 20. Therefore, the bezel 10 and the display panel 20 are bonded and fixed to each other.

The flat panel display 1 may be a liquid crystal display (LCD), a field emission display (FED), or an organic light emitting diode display device (OLED), depending on the constitution of the display panel 20.

The bezel 10 includes a substrate 11 configured to support the display panel 20, a bent part 13 formed by bending a periphery of the substrate 11 in the same direction, for example, a vertical direction, and a receiving part 15 formed by the substrate 11 and the bent part 13. The bezel 10 is received in the receiving part 15.

At this time, the bezel 10 may be formed of a conductive metal material or a plastic material. When the bezel 10 is formed of a metal material, the bezel 10 may be electrically connected to the display panel 10 and a ground terminal of a printed circuit board (not shown) to improve electrical reliability and strength against an external impact.

The substrate 11 supports the received display panel 20, and the display panel 20 is attached to the substrate 11 and fixed thereto by the bonding agent 30.

The display panel 20 is received in the bezel 10, and a region of the display panel 20 facing the substrate 11 is fixed to the substrate 11 by the bonding agent 30.

The display panel 20 may be applied to a compact mobile device such as a mobile phone, a personal digital assistant (PDA), etc., or a large-sized display device such as a television, etc.

The display panel 20 includes a device substrate 21, on which a pixel region 25 having a plurality of pixels is formed, and an encapsulation substrate 23 adhered to the device substrate 21 by a sealant 27, and displays an image in response to an external signal.

The sealant 27 is applied along a periphery of the pixel region 25 to adhere the device substrate 21 to the encapsulation substrate 23.

Therefore, the space between the device substrate 21 and the encapsulation substrate 23 is encapsulated by the sealant 27 so that the pixel region 25 is protected from external gas or moisture.

A pad part 29 may be formed in a portion of the device substrate 21 extending beyond the encapsulation substrate 23 and electrically connected to a controller (not shown) configured to control an image to be displayed.

The present invention may be applied to any structure of the pixel region 25, and thus, detailed descriptions of the pixel region 25 will be omitted.

The bonding agent 30 is disposed between the bezel 10 and the display panel 20 to fix the display panel 20 to the bezel 10.

In this embodiment, the bonding agent 30 is interposed between the substrate 11 of the bezel 10 and the device substrate 21 of the display panel 20.

When the bezel 10 and the display panel 20 are fixed by the bonding agent 30, it is possible to prevent the display panel 20 from being pushed from the bezel 10 when they are fixed by the double-sided adhesion tape, and it is possible to apply the bonding agent 30 to a thickness smaller than that of the double-sided adhesion tape, accomplishing a flat panel display having a more compact structure.

In addition, since mechanical strength against an external pressure can be increased, it is possible to prevent the flat panel display 1 including the display panel 20 received in the bezel 10 from being readily bent or damaged.

The following Table 1 represents data showing strengths (breaking pressures) of the flat panel displays when they were broken in tri-axial bending tests, in the case of a display panel only and a bezel only, in the case that the display panel and the bezel were attached by the adhesion tape, and in the case that the display panel and the bezel were bonded to each other. Here, the tests were performed using the display panel and the bezel having the same characteristics.

TABLE 1

| | | | |
|---|---|---|---|
| Comparative Example 1 | Face Up | Display panel only | 4.47 Kg |
| Comparative Example 2 | | Bezel only | 2.2 Kg |
| Comparative Example 3 | | Display panel and bezel attached by tape | 6.71 Kg |
| Embodiment 1 | | Display panel and bezel bonded to each other | 12.1 Kg |
| Comparative Example 4 | Face Down | Display panel only | 4.31 Kg |
| Comparative Example 5 | | Bezel only | 2.3 Kg |
| Comparative Example 6 | | Display panel and bezel attached by tape | 6.43 Kg |
| Embodiment 2 | | Display panel and bezel bonded to each other | 9.13 Kg |

The tri-axial test is a method of measuring a pressure when a sample is broken while the pressure is applied and gradually increased on an upper center of the sample in a state in which both lower ends of the sample are supported by rods, etc.

In Table 1, 'Face Up' means that the pressure was applied in a state in which the display surface was directed upward, and 'Face Down' means that the pressure was applied in a state in which the display surface was directed downward.

In the case of 'Face Up', the display panel attached to the bezel using the tape was broken at 6.71 Kg, which is approximate to 6.67 Kg, i.e., the sum breaking pressure of the display panel and the bezel.

However, the display panel and the bezel bonded to each other were broken at 12.1 Kg, which was improved by about 81% of 6.67 Kg, i.e., the sum breaking pressure of the display panel and the bezel.

Similarly, even in the case of 'Face Down', the display panel attached to the bezel using the tape was broken at 6.43 Kg, which is slightly lower than 6.61 Kg, i.e., the sum breaking pressure of the display panel and the bezel.

However, the display panel and the bezel bonded to each other were broken at 9.13 Kg, which was improved by about 38% of 6.61 Kg, i.e., the sum breaking pressure of the display panel and the bezel.

Therefore, it will be appreciated that the strength against an external pressure can be further increased when the display panel 20 is bonded to the bezel in comparison with when it is attached by the adhesion tape. That is, when the bezel 10 and the display panel 20 are fixed by the bonding agent 30, it is possible to prevent the display panel 20 from being pushed by share stress, so that the strength against an external pressure can be further increased.

In addition, as shown in FIG. 4, when the bezel 10 includes a reinforcement part 17 formed in the substrate 11, since the external pressure can be distributed, it is possible to improve the strength against the external pressure.

The reinforcement part 17 is formed by pressing a portion of the substrate 11. If the reinforcement part 17 is pressed inward, since the total height of the display panel 20 is increased to increase the total thickness of the flat panel display 1, the reinforcement part 17 may be pressed outward.

Figure 5A:
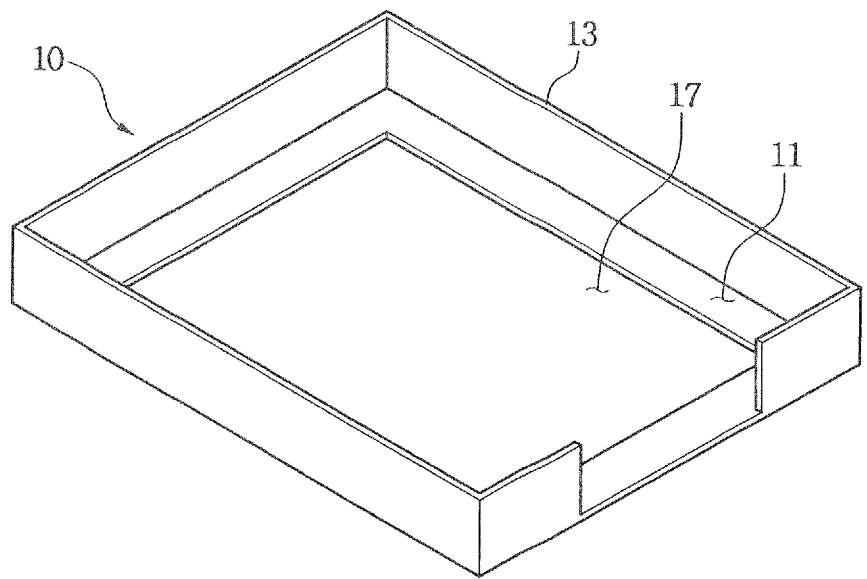
FIGS. 5A to 5E are perspective views showing various shapes of a reinforcement part shown in FIG. 4.
Figure 5B:
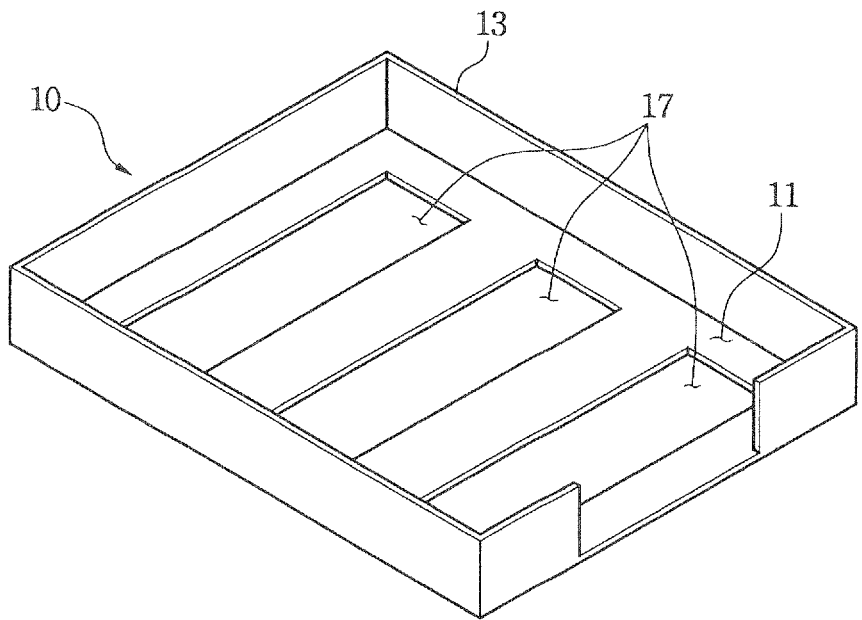
Figure 5C:
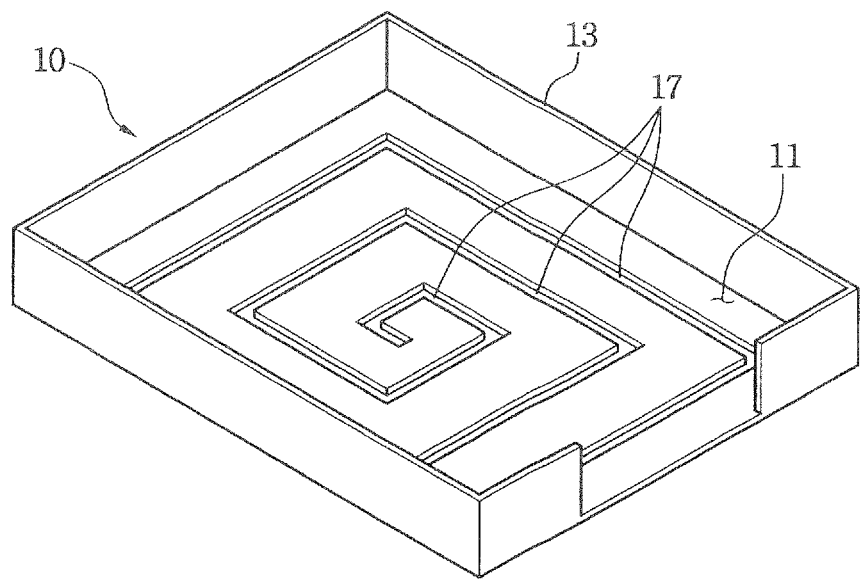
Figure 5D:
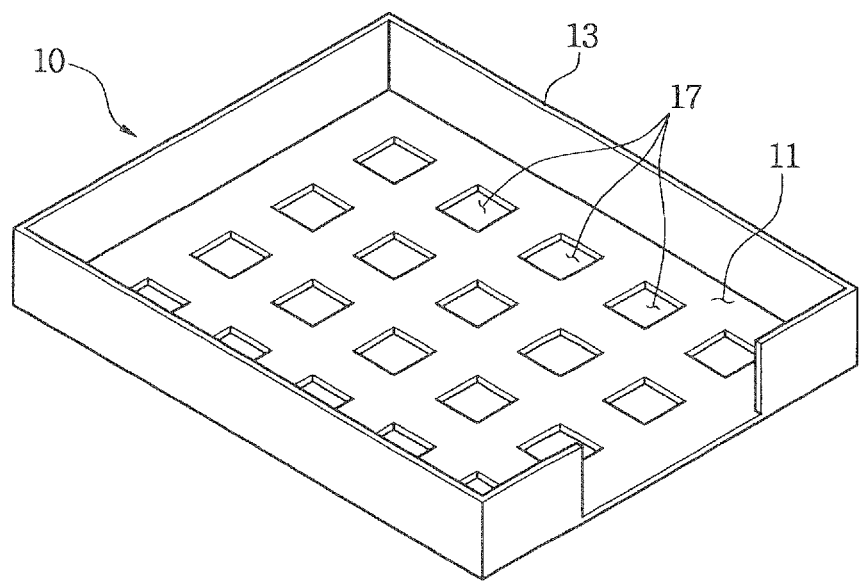
Figure 5E:
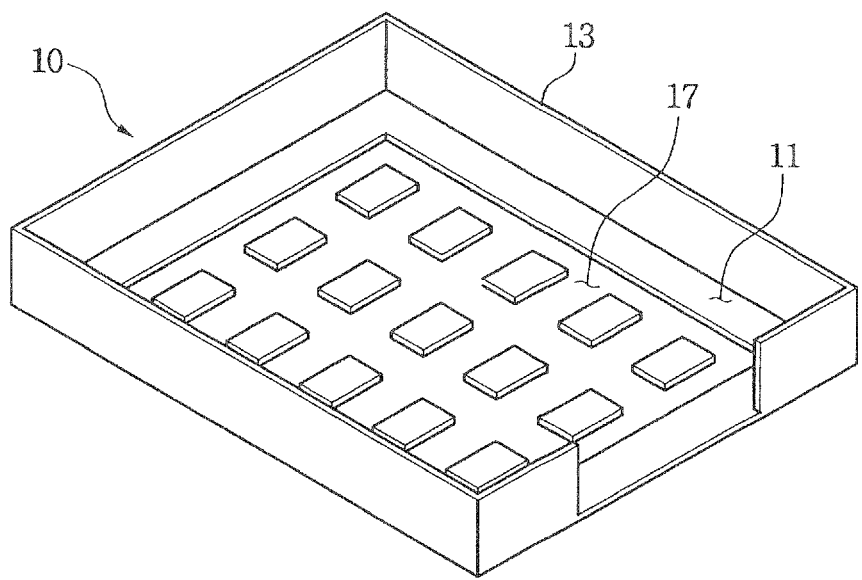

The reinforcement part 17 may have one or a plurality of linear shapes as shown in FIGS. 5A and 5B, a spiral shape as shown in FIG. 5C, a matrix shape as shown in FIG. 5D, or a mesh shape as shown in FIG. 5E, but the reinforcement part 17 is not limited thereto.

As can be seen from the foregoing, it is possible to provide a flat panel display having a small thickness and capable of improving strength against an external pressure.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A flat panel display device comprising:
   a display panel;
   a bezel having a substrate to support the display panel and configured to receive the display panel;
   a bonding agent disposed between the substrate of the bezel and the display panel; and
   a reinforcement part pressed into the substrate of the bezel in a spiral shape, a matrix shape, or a mesh shape.

2. The flat panel display device according to claim 1, wherein the flat panel display device is any one of a liquid crystal display device, a field emission display device, and an organic light emitting diode display device.

3. The flat panel display device according to claim 1, wherein the bezel further comprises:
   a bent part formed by bending a periphery of the substrate in the same direction; and
   a receiving part formed by the substrate and the bent part, wherein the display panel is received in the receiving part.

4. The flat panel display device according to claim 1, wherein the bezel is formed of a metal material or a plastic material.

5. The flat panel display device according to claim 1, wherein the display panel comprises a device substrate having a pixel region, and an encapsulation substrate adhered to the device substrate by a sealant,
   wherein the bonding agent is interposed between the substrate of the bezel and the device substrate.

6. The flat panel display device according to claim 1, wherein the reinforcement part is pressed toward an outside of the substrate.

7. The flat panel display device according to claim 1, wherein one or more reinforcement parts are formed.

8. The flat panel display device according to claim 1, wherein the reinforcement part has a linear shape.

9. A flat panel display device, comprising:
   a display panel;
   a bezel having a substrate to support the display panel and configured to receive the display panel, characterized in that the substrate of the bezel and the display panel are bonded and fixed to each other; and
   a reinforcement part pressed into the substrate of the bezel in a spiral shape, a matrix shape, or a mesh shame.

10. The flat panel display device according to claim 9, wherein the bezel further comprises:
    a bent part formed by bending a periphery of the substrate in the same direction; and
    a receiving part formed by the substrate and the bent part, wherein the display panel is received in the receiving part.

11. The flat panel display device according to claim 9, wherein the display panel comprises a device substrate having a pixel region, and an encapsulation substrate adhered to the device substrate by a sealant,
    wherein the substrate of the bezel and the device substrate are bonded to each other.

12. The flat panel display device according to claim 9, wherein the reinforcement part is pressed toward an outside of the substrate.

13. The flat panel display device according to claim 9, wherein the reinforcement part has a linear shape.

* * * * *